United States Patent
Matsuzaki

(10) Patent No.: US 12,290,014 B2
(45) Date of Patent: May 6, 2025

(54) WORKING VEHICLE

(71) Applicant: KUBOTA CORPORATION, Osaka (JP)

(72) Inventor: Yushi Matsuzaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 253 days.

(21) Appl. No.: 17/751,801

(22) Filed: May 24, 2022

(65) Prior Publication Data

US 2022/0287216 A1    Sep. 15, 2022

Related U.S. Application Data

(63) Continuation of application No. PCT/JP2020/048212, filed on Dec. 23, 2020.

(30) Foreign Application Priority Data

Dec. 27, 2019 (JP) ................. 2019-239889

(51) Int. Cl.
*A01B 59/06* (2006.01)
*A01B 63/111* (2006.01)
*A01B 69/04* (2006.01)

(52) U.S. Cl.
CPC ........ *A01B 59/067* (2013.01); *A01B 63/1112* (2013.01); *A01B 69/008* (2013.01)

(58) Field of Classification Search
CPC .. A01B 59/067; A01B 63/1112; A01B 69/008
See application file for complete search history.

(56) References Cited

U.S. PATENT DOCUMENTS

| | | | |
|---|---|---|---|
| 7,199,723 B1 * | 4/2007 | Eslambolchi | G01V 3/15 340/686.2 |
| 11,582,903 B1 * | 2/2023 | Brown | B60W 10/20 |

(Continued)

FOREIGN PATENT DOCUMENTS

| | | |
|---|---|---|
| EP | 3 125 058 A1 | 2/2017 |
| EP | 3 125 059 A1 | 2/2017 |

(Continued)

OTHER PUBLICATIONS

Official Communication issued in International Patent Application No. PCT/JP2020/048212, mailed on Mar. 2, 2021.

(Continued)

*Primary Examiner* — Vivek D Koppikar
*Assistant Examiner* — Godfrey Aleksander Maciorowski
(74) *Attorney, Agent, or Firm* — Keating & Bennett, LLP

(57) ABSTRACT

A working vehicle includes a traveling vehicle body, a linking device capable of linking a working device to the traveling vehicle body, a sensor provided on the working device to monitor at least a surrounding area of the working device provided on the working device, and a controller to perform control relating to automatic operation of the traveling vehicle body based on a planned travel route and monitored information obtained by the sensor. The controller is configured or programmed to include an automatic operation controller to determine the automatic operation to be performed if the monitored information contains no obstacles and to determine the automatic operation not to be performed if the monitored information contains an obstacle.

14 Claims, 12 Drawing Sheets

(56) References Cited

U.S. PATENT DOCUMENTS

| | | | |
|---|---|---|---|
| 2014/0222288 A1* | 8/2014 | Lavoie | B62D 15/0285 |
| | | | 701/99 |
| 2015/0305224 A1* | 10/2015 | Casper | A01B 33/16 |
| | | | 701/50 |
| 2017/0139418 A1* | 5/2017 | Hiramatsu | A01B 69/008 |
| 2017/0248946 A1* | 8/2017 | Ogura | A01B 69/008 |
| 2019/0382005 A1 | 12/2019 | Nishi et al. | |
| 2020/0214266 A1* | 7/2020 | Fujiyama | G06V 10/62 |

FOREIGN PATENT DOCUMENTS

| | | |
|---|---|---|
| EP | 3 125 061 A1 | 2/2017 |
| EP | 3 270 253 A1 | 1/2018 |
| JP | 61-141812 A | 6/1986 |
| JP | 2017-176008 A | 10/2017 |
| JP | 2017217945 A | 12/2017 |
| JP | 2018-116609 A | 7/2018 |
| JP | 2019-000080 A | 1/2019 |
| JP | 2019-129740 A | 8/2019 |
| JP | 2019-146506 A | 9/2019 |
| JP | 2019170271 * | 10/2019 |

OTHER PUBLICATIONS

Official Communication issued in corresponding European Patent Application No. 20908317.9, mailed on Dec. 11, 2023.

Official Communication issued in corresponding Chinese Patent Application No. 202080084069.0, mailed on Nov. 20, 2024, 10 pages.

* cited by examiner

WORKING VEHICLE

CROSS REFERENCE TO RELATED APPLICATIONS

This application is a continuation application of International Application No. PCT/JP2020/048212, filed on Dec. 23, 2020, which claims the benefit of priority to Japanese Patent Application No. 2019-239889, filed on Dec. 27, 2019. The entire contents of each of these applications are hereby incorporated herein by reference.

BACKGROUND OF THE INVENTION

1. Field of the Invention

The present invention relates to, for example, a working vehicle such as a tractor.

2. Description of the Related Art

A technique disclosed in Japanese Unexamined Patent Application Publication No. 2018-116609 is known as a technique to cause a working vehicle such as a tractor to operate automatically. A work vehicle of Japanese Unexamined Patent Application Publication No. 2018-116609 includes an electronic control system for automatic operation in which a vehicle body operates automatically, wherein the electronic control system includes an obstacle detection module to detect whether or not there is an obstacle, and a contact avoidance control unit to perform contact avoidance control to, when the obstacle detection module has detected an obstacle, avoid contact with the obstacle, and the obstacle detection module includes a plurality of obstacle sensors which are arranged at the front edge and left and right edges of a vehicle body in a dispersed manner so that the area in front of the vehicle body and areas at the left and right sides of the vehicle body are areas to be monitored. Furthermore, in the electronic control system of the Japanese Unexamined Patent Application Publication No. 2018-116609, a monitoring camera is provided at the rear of the vehicle body, specifically, at the rear of an upper portion of a cabin.

SUMMARY OF THE INVENTION

According to Japanese Unexamined Patent Application Publication No. 2018-116609, it is possible to cause the vehicle body to travel forward while performing searching using the plurality of obstacle sensors and also possible to check, using an image captured by the monitoring camera, the surrounding area of the vehicle body such as the area rearward of the vehicle body by using the monitoring camera. However, in reality, Japanese Unexamined Patent Application Publication No. 2018-116609 does not take into consideration the situations in which a working device is attached to the vehicle body.

Preferred embodiments of the present invention provide working vehicles, each of which is capable of performing automatic operation smoothly even in cases where a working device is linked to a vehicle body.

Preferred embodiments of the present invention are characterized by the following aspects.

A working vehicle includes a traveling vehicle body, a linking device capable of linking a working device to the traveling vehicle body, a first sensor provided on the working device to monitor at least a surrounding area of the working device, and a controller to perform control relating to automatic operation of the traveling vehicle body based on a planned travel route and monitored information obtained by the first sensor.

The controller is configured or programmed to include an automatic operation controller to determine the automatic operation to be performed if the monitored information contains no obstacles and to determine the automatic operation not to be performed if the monitored information contains an obstacle.

The linking device may be a raising/lowering device to raise and lower the working device, and after initiation of the automatic operation, the automatic operation controller is configured or programmed to determine the automatic operation to be stopped if the monitored information obtained when the working device is held in a raised position by the raising/lowering device contains an obstacle.

The controller is configured or programmed to include a work manager to extract one or more worked conditions resulting from work done by the working device based on the monitored information obtained by the first sensor.

The working vehicle further includes a second sensor provided on the traveling vehicle body, a viewing direction of the second sensor being the same as a viewing direction of the first sensor.

A working vehicle includes a traveling vehicle body, a linking device capable of linking a working device to the traveling vehicle body, a first sensor provided on the working device, and a controller configured or programmed to include an automatic operation controller to perform control relating to automatic operation of the traveling vehicle body based on a planned travel route and monitored information obtained by the first sensor, and a work manager to extract one or more worked conditions resulting from work done by the working device based on the monitored information.

The work manager extracts the one or more worked conditions after initiation of the automatic operation.

The linking device may be a raising/lowering device to raise and lower the working device, the automatic operation controller is configured or programmed to determine the automatic operation to be performed if the monitored information contains no obstacles, and determine the automatic operation not to be performed if the monitored information contains an obstacle, and after initiation of the automatic operation, determine the automatic operation to be stopped if the monitored information obtained when the working device is held in a raised position by the raising/lowering device contains an obstacle, and determine the automatic operation to continue if the monitored information obtained when the working device is held in the raised position by the raising/lowering device contains no obstacles, and the work manager is configured or programmed to extract the one or more worked conditions based on the first monitored information obtained in a period from the initiation of the automatic operation to raising of the working device.

The working vehicle further includes a switch to switch, based on the monitored information obtained by the first sensor, between control of the automatic operation by the automatic operation controller and monitoring of the one or more worked conditions resulting from work done by the working device.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
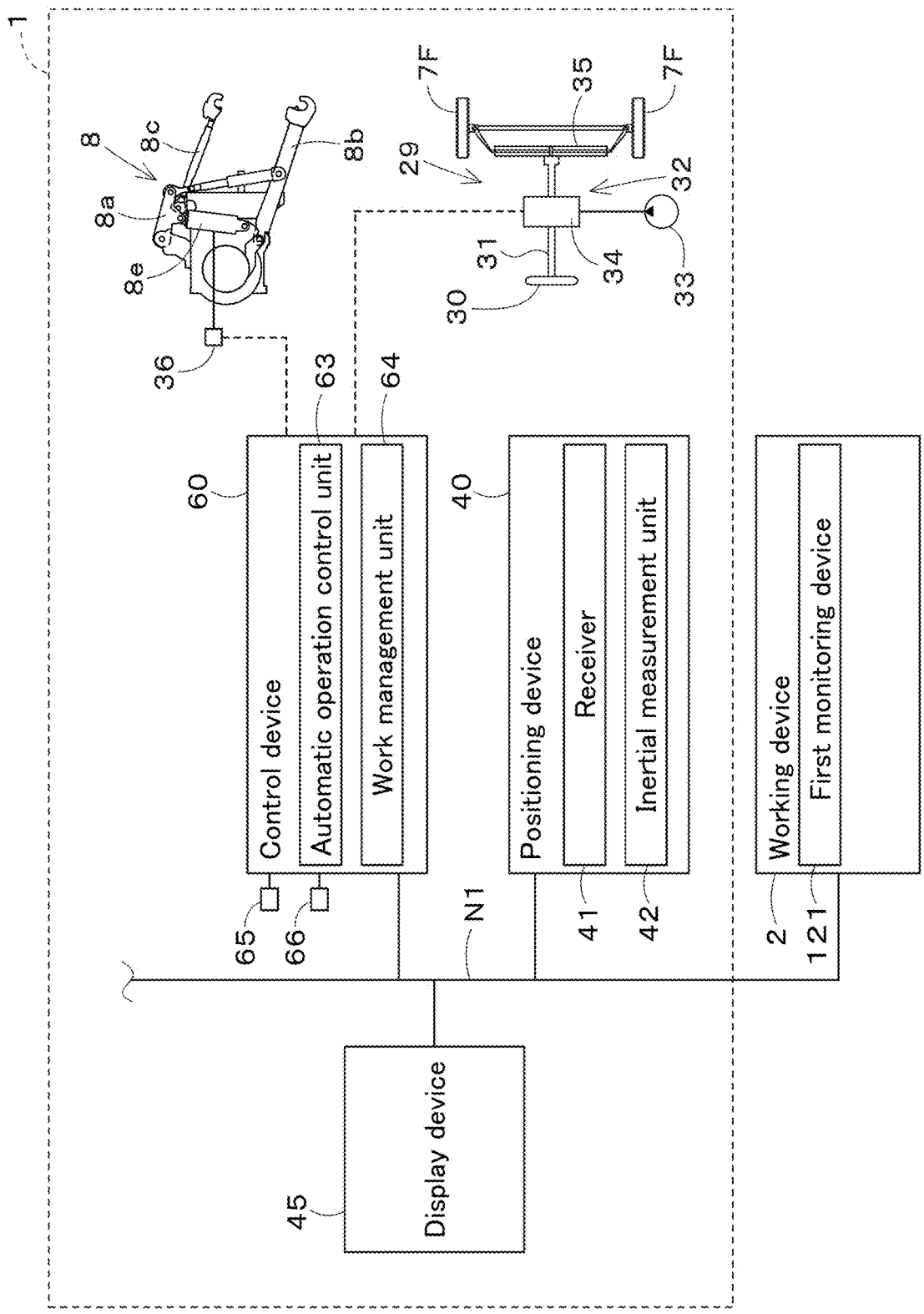
FIG. 1 shows a block diagram of a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

Figure 10:
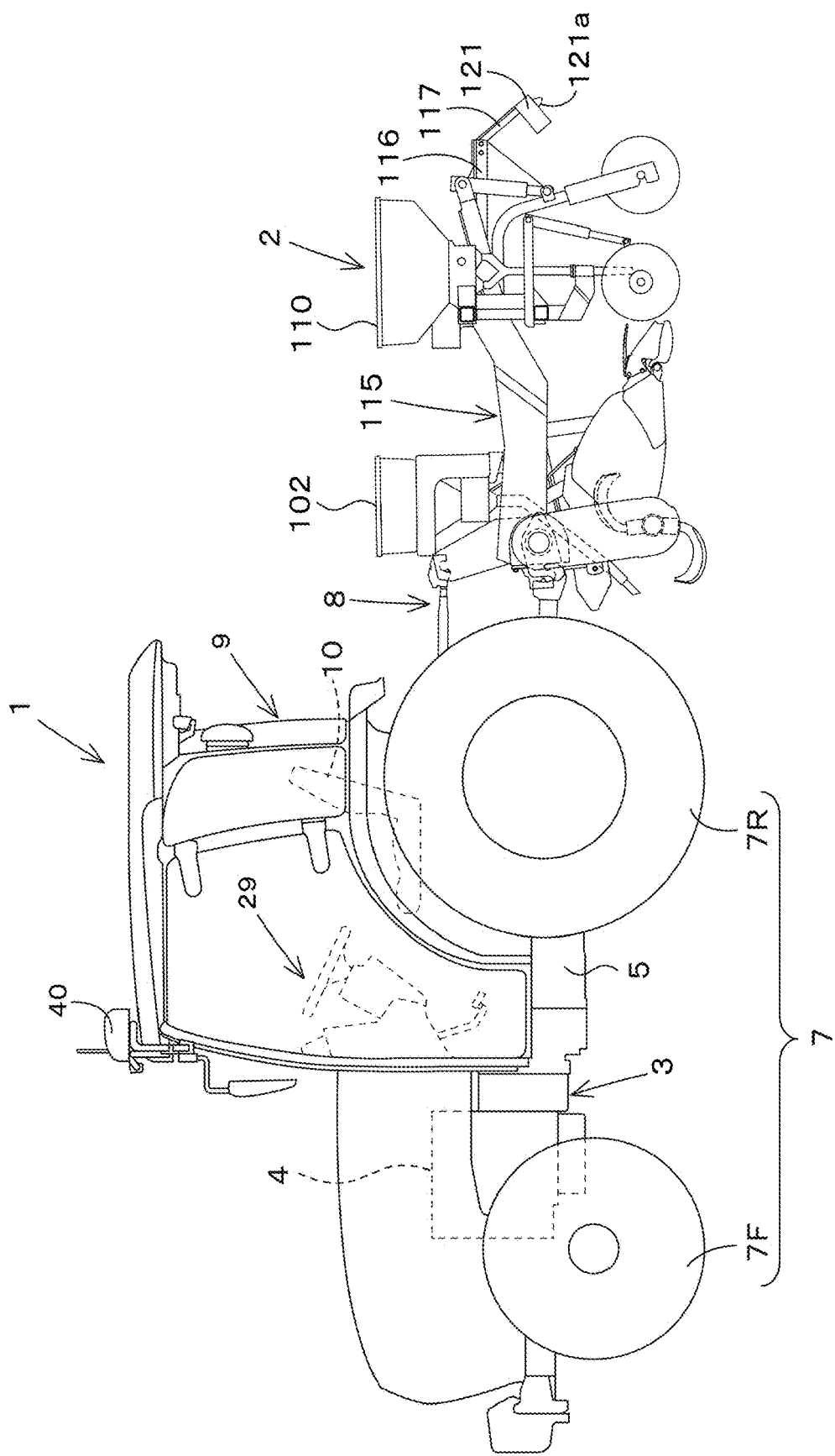
FIG. 10 is a general side view of a tractor.

FIG. 10 illustrates a tractor 1, which is an example of a working vehicle. The working vehicle is discussed using the tractor 1 as an example, but the working vehicle is not limited to a tractor and may be a rice transplanter or a combine.

As illustrated in FIG. 10, the tractor 1 includes a traveling vehicle body 3 with a traveling device 7, a prime mover 4, and a transmission 5. The traveling device 7 includes front wheel(s) 7F and rear wheel(s) 7R. The front wheels 7F may be tire-shaped wheels and may be crawler-shaped wheels. The rear wheels 7R also may be tire-shaped wheels and may be crawler-shaped wheels. The prime mover 4 may be a diesel engine, an electric motor, and/or the like. The transmission 5 is capable of changing driving forces for the traveling device 7 by changing speed stages and switching the traveling state of the traveling device 7 between forward and rearward traveling states. The traveling vehicle body 3 is provided with a cabin 9, and the cabin 9 is provided with the operator's seat 10 therein.

Furthermore, the traveling vehicle body 3 is provided with a linking device at the rear thereof. The linking device is a swinging drawbar which links a working device 2 and the traveling vehicle body 3 and does not raise or lower the working device 2, a raising/lowering device 8 including a three-point linkage or the like and which raises and lowers the working device 2, or the like. The linking device can have the working device 2 attached thereto and detached therefrom. By linking the working device 2 to the linking device, it is possible for the traveling vehicle body 3 to tow the working device 2. The working device 2 may be a cultivator for cultivation, a fertilizer spreader for spreading fertilizer, a transplanter for planting seedlings, a water spreader for spreading water, an agricultural chemical spreader for spreading agricultural chemicals, a seed spreader for spreading seeds, a mower for mowing grass or the like, a tedder for tedding grass or the like, a rake for raking grass or the like, a baler for baling grass or the like, a combined implement for a plurality of types of work, and/or the like.

Figure 3:
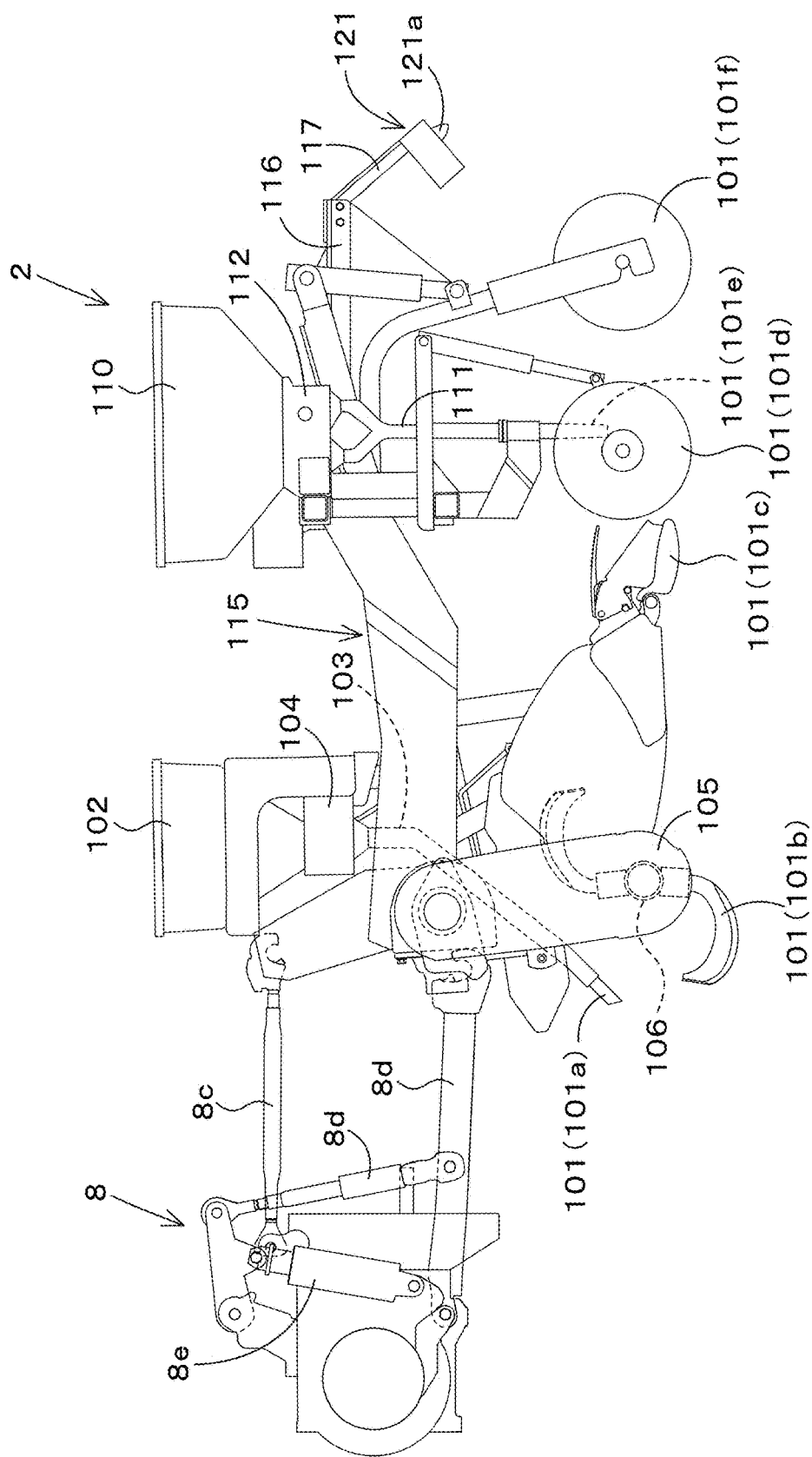
FIG. 3 shows a side view of a combined implement.
Figure 4:
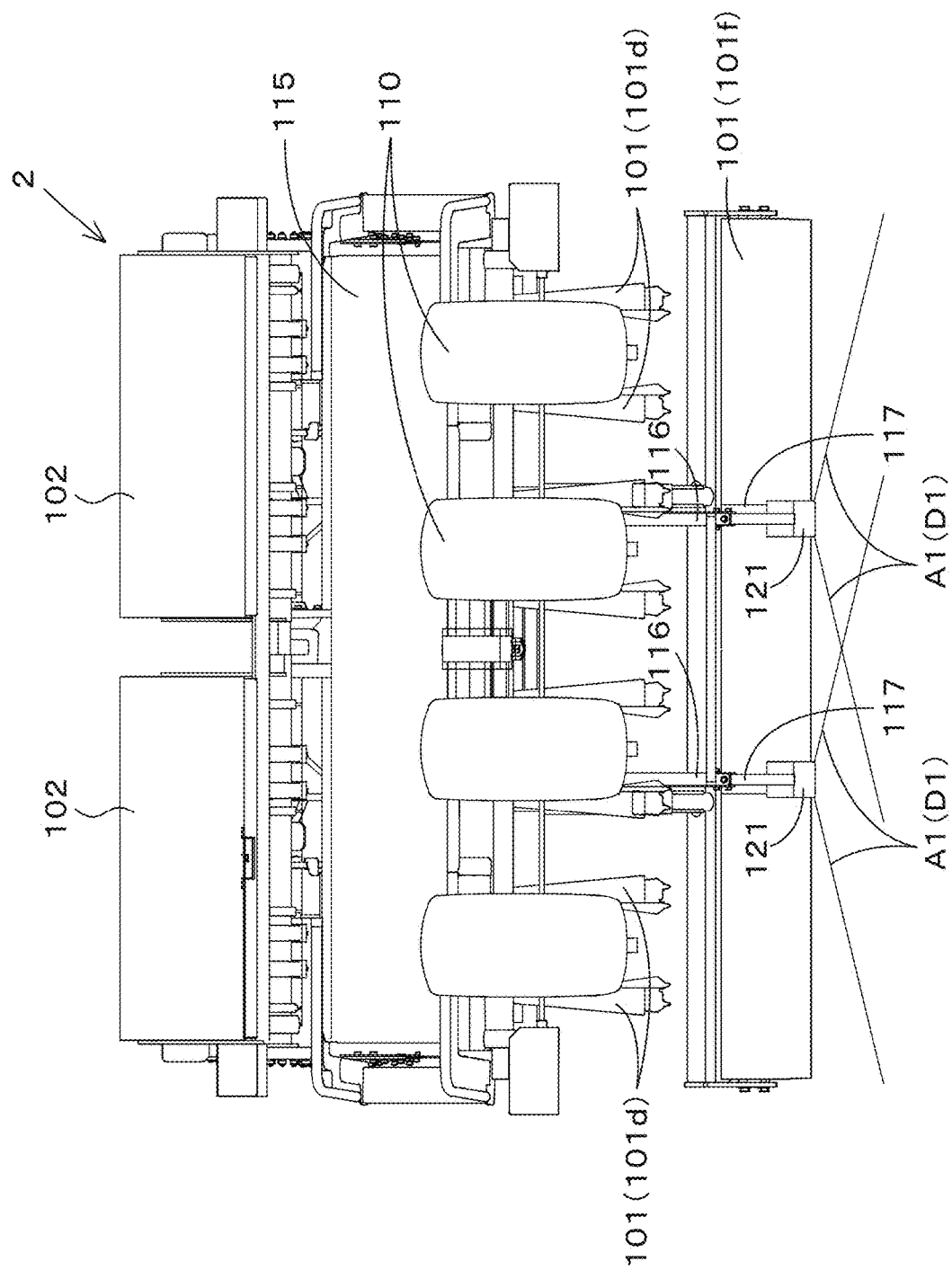
FIG. 4 shows a plan view of the combined implement.

FIGS. 3 and 4 illustrate a combined implement which is a type of the working device 2. The combined implement as illustrated in FIGS. 3 and 4 includes a plurality of working units 101. The plurality of working units 101 include a first working unit 101a, a second working unit 101b, a third working unit 101c, a fourth working unit 101d, a fifth working unit 101e, and a sixth working unit 101f. The working unit 101a, the second working unit 101b, the third working unit 101c, the fourth working unit 101d, the fifth working unit 101e, and the sixth working unit 101f are arranged in this order from front to rear. The first working unit 101a is located foremost, and the sixth working unit 101f is located rearmost.

The first working unit 101a may include fertilizer applicator nozzle(s) to spread fertilizer introduced in container(s) 102, and is connected via hose(s) 103 to dispenser(s) 104 which dispenses the fertilizer from the container(s) 102. The first working unit 101a spreads, onto an agricultural field (ground), fertilizer which has been dispensed into the hose(s) 103 by driving the dispenser(s) 104. The second working unit 101b may include tillage tine(s) to cultivate the agricultural field, and is attached to a rotation shaft 106 which is caused by a drive mechanism 105 to rotate. The second working unit 101b is caused to rotate with the rotation of the rotation shaft 106 to cultivate the agricultural field, by driving the drive mechanism 105. The third working unit 101c may include land leveler cover(s) disposed rearward of the second working unit 101b, and levels the cultivated ground. In the case of the combined implement in FIGS. 3 and 4, the first working unit 101a, the second working unit 101b, and the third working unit 101c are part of a fertilizer applicator.

The fourth working unit 101d may include grooving disc(s) for formation of grooves. The fifth working unit 101e is seeding nozzle(s) to plant seeds introduced in container(s) 110, and is connected via hose(s) 111 to dispenser(s) 112 which dispenses the seeds from the container(s) 110. The fifth working unit 101e plants, into groove(s) formed by the fourth working unit 101d, seeds which have been dispensed into the hose(s) 111 by driving the dispenser(s) 112. The sixth working unit 101f is rotatably supported tamping roller(s), and tamps at least an area where seeds have been planted. In the case of the combined implement of FIGS. 3 and 4, the fourth working unit 101d, the fifth working unit 101e, and the sixth working unit 101f are part of a seeder.

Figure 2:
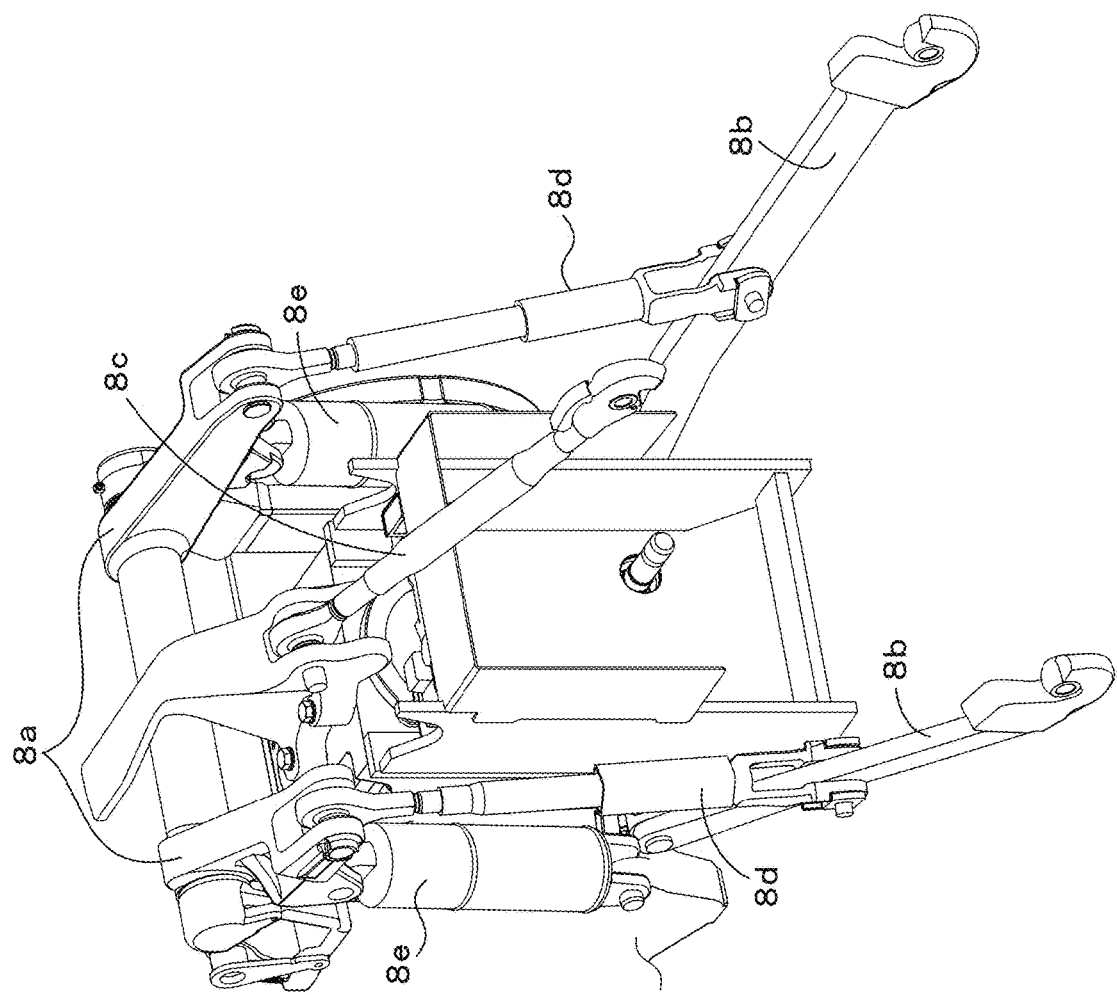
FIG. 2 illustrates a raising/lowering device.

The first working unit 101a, the second working unit 101b, the third working unit 101c, the fourth working unit 101d, the fifth working unit 101e, and the sixth working unit 101f are supported by a frame 115, and are configured to be raised and lowered by the raising/lowering device 8. Specifically, the fertilizer applicator and the seeder have the frame 115, and are supported on lift arms 8a, lower links 8b, a top link 8c, lift rods 8d, and lift cylinders 8e as illustrated in FIG. 2 such that the fertilizer applicator and the seeder can be raised and lowered. Furthermore, the dispenser(s) 104, the drive mechanism 105, and the dispenser(s) 112 are driven (actuated) by rotation of a PTO shaft projecting from a rear portion of the traveling vehicle body 3.

As illustrated in FIG. 2, the raising/lowering device 8 includes lift arms 8a, lower links 8b, a top link 8c, lift rods 8*d*, and lift cylinders 8*e*. A front end of each lift arm 8*a* is supported on an upper rear portion of a case (transmission case) housing the transmission 5 such that the lift arm 8*a* is swingable up and down. The lift arm 8*a* is driven by a corresponding lift cylinder 8*e* to swing (raised or lowered). The lift cylinder 8*e* includes a hydraulic cylinder. The lift cylinder 8*e* is connected to a hydraulic pump via a control valve 36. The control valve 36 is a solenoid valve or the like to cause the lift cylinder 8*e* to extend and retract.

A front end of each lower link 8*b* is supported on a lower rear portion of the transmission 5 such that the lower link 8*b* is swingable up and down. A front end of the top link 8*c* is supported, at a position higher than the lower link 8*b*, on a rear portion of the transmission 5 such that the top link 8*c* is swingable up and down. Each lift rod 8*d* connects a corresponding lift arm 8*a* and a corresponding lower link 8*b*. The working device 2 is linked to rear portions of the lower links 8*b* and the top link 8*c*. When the lift cylinders 8*e* are driven (extend or retract), the lift arms 8*a* ascend or descend, and the lower links 8*b* connected to the lift arms 8*a* via the lift rods 8*d* also ascend or descend. With this, the working device 2 swings up or down (raised or lowered) about front portions of the lower links 8*b*.

As illustrated in FIG. 1, the tractor 1 includes a steering unit 29. The steering unit 29 includes a steering wheel 30, a rotation shaft (steering shaft) 31 which rotates as the steering wheel 30 rotates, and an assist mechanism (power steering mechanism) 32 to assist steering performed using the steering wheel 30. The assist mechanism 32 includes a hydraulic pump 33, a control valve 34 supplied with hydraulic fluid discharged from the hydraulic pump 33, and a steering cylinder 35 which is actuated by the control valve 34. The control valve 34 is a solenoid valve which is actuated according to a control signal. The control valve 34 is, for example, a three-way switching valve which achieves multi-position switching by movement of a spool or the like. The positions of the control valve 34 can also be switched by steering by the steering shaft 31. The steering cylinder 35 is connected to arms (knuckle arms) which change the orientation of the front wheels 7F.

Therefore, upon operation of the steering wheel 30, the position and the degree of opening of the control valve 34 change according to the steering wheel 30, and the steering cylinder 35 extends or retracts leftward or rightward according to the position and the degree of opening of the control valve 34, making it possible to change the steering direction of the front wheels 7F. Note that the foregoing steering unit 29 is an example, and the foregoing configuration does not imply any limitation.

The tractor 1 includes a positioning device 40. The positioning device 40 is capable of detecting the position thereof (measured position information including latitude and longitude) using a satellite positioning system (positioning satellites) such as D-GPS, GPS, GLONASS, BeiDou, Galileo, and/or Michibiki. Specifically, the positioning device 40 receives satellite signals (positions of positioning satellites, time of transmission, correction information, and/or the like) from the positioning satellites, and detects the position (e.g., latitude and longitude) of the tractor 1, i.e., a vehicle body position, based on the satellite signals. The positioning device 40 includes a receiver 41 and an inertial measurement unit (IMU) 42. The receiver 41 is a device which includes an antenna and/or the like and which receives satellite signals from the positioning satellites, and is attached to the traveling vehicle body 3 separately from the inertial measurement unit 42. In the present preferred embodiment, the receiver 41 is attached to the traveling vehicle body 3, e.g., the cabin 9. Note that the location at which the receiver 41 is attached is not limited to those described in the preferred embodiments of the present invention.

The inertial measurement unit 42 includes an acceleration sensor to detect acceleration, a gyroscope sensor to detect angular velocity, and/or the like. The inertial measurement unit 42 is provided on the traveling vehicle body 3, for example, below the operator's seat 10, and is capable of detecting the roll angle, pitch angle, yaw angle, and/or the like of the traveling vehicle body 3.

As illustrated in FIGS. 3 and 4, the working device 2 is provided with first monitoring device(s) 121 (first monitoring sensor(s)). Each first monitoring device 121 is a device capable of detecting objects present in a surrounding area of the working device 2. The first monitoring device 121 may include a camera (imaging device), a laser scanner, sonar, and/or the like. A camera (imaging device) captures an image of a surrounding area of the working device 2 using an image sensor such as a CCD and/or CMOS, and thereby, when the captured image contains an object, detects the object. A laser scanner detects an object by emitting laser and receiving the reflected laser from the object. Sonar detects an object by emitting sound waves and receiving the reflected sound waves from the object.

Each first monitoring device 121 is attached, via a bracket 117, to a distal end portion of a support 116 which extends rearward from the frame 115 of the working device 2. In the present preferred embodiment, such supports 116 are provided on respective opposite sides (left and right sides) of the frame 115, and such first monitoring devices 121 are attached to the respective supports 116 via respective brackets 117. A viewing direction of each first monitoring device 121 is inclined downward relative to a horizontal direction to some degree, i.e., inclined toward working units. Note that the viewing direction is the direction of the optical axis of laser emitted in the case where the first monitoring device 121 is a laser scanner, is the direction of emission of sound waves in the case where the first monitoring device 121 is sonar, and is the direction of the optical axis (central axis of a lens) of an image sensor in the case where the first monitoring device 121 is a camera.

An emitting portion 121*a* to emit a laser is located rearward of the sixth working unit 101*f* which is located at the rearmost position of the working device 2. In the case where the first monitoring device 121 is sonar, an emitting portion 121*a* to emit sound waves is located rearward of the sixth working unit 101*f*. In the case where the first monitoring device 121 is a camera, a lens portion through which light passes is located rearward of the sixth working unit 101*f*.

As illustrated in FIG. 4, a monitored area A1 of each first monitoring device 121 is near and behind the working device 2. Each first monitoring device 121 is capable of performing monitoring by detecting what the object in the monitored area A1 is. The monitored areas A1 cover, for example, a continuous area extending between the left and right edges of the working device 2.

As illustrated in FIG. 1, the tractor 1 includes a controller 60. The controller 60 is configured or programmed to perform control of a travel system of the tractor 1, control of a work system of the tractor 1, and/or the like. The controller 60 includes an operation changeover switch 65 connected thereto. The operation changeover switch 65 is capable of switching between ON and OFF. The controller 60 can be set to an automatic operation mode when the operation changeover switch 65 is ON, and the controller 60 can be set to a manual operation mode when the operation changeover switch 65 is OFF.

The controller 60 is configured or programmed to include an automatic operation control unit 63 which performs control relating to the automatic operation of the tractor 1 (traveling vehicle body 3) based on a planned travel route. The automatic operation control unit 63 includes electric/electronic circuit(s) provided in the controller 60, program(s) stored in a CPU and/or the like, and/or the like.

Figure 5:
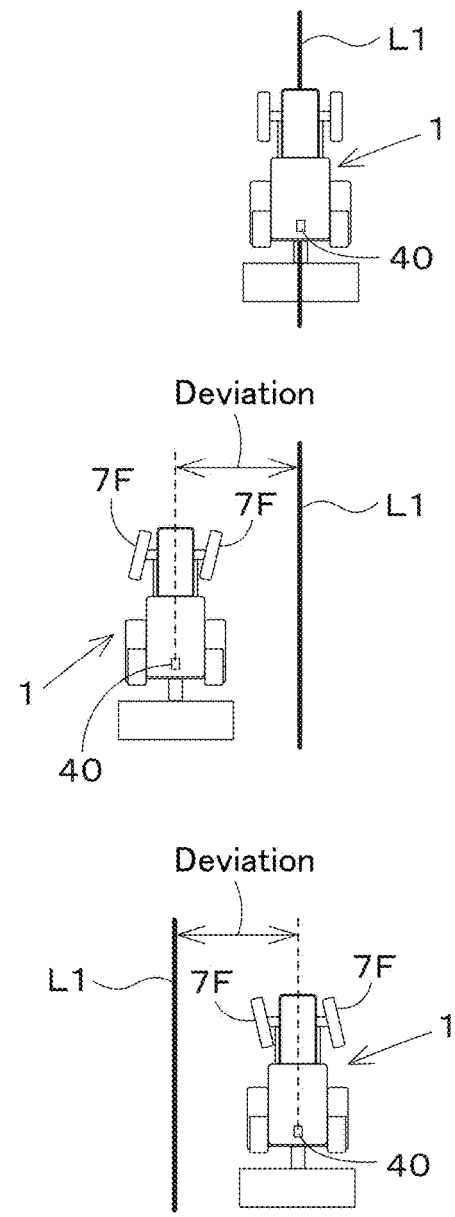
FIG. 5 illustrates automatic operation.

The automatic operation control unit 63 controls automatic operation of the traveling vehicle body 3. The automatic operation control unit 63 starts the automatic operation when the tractor 1 is in an automatic operation mode. As illustrated in FIG. 5, when the tractor 1 is performing automatic operation, if the deviation between the vehicle body position and the planned travel route L1 is less than a threshold, the automatic operation control unit 63 maintains the angle of rotation of the steering shaft (rotation shaft) 31. If the deviation between the vehicle body position and the planned travel route L1 is equal to or greater than the threshold and the tractor 1 is positioned leftward of the planned travel route L1, the automatic operation control unit 63 causes the steering shaft 31 to rotate so that the tractor 1 is steered right. If the deviation between the vehicle body position and the planned travel route L1 is equal to or greater than the threshold and the tractor 1 is positioned rightward of the planned travel route L1, the automatic operation control unit 63 causes the steering shaft 31 to rotate so that the tractor 1 is steered left. Note that, although the angle of steering by the steering unit 29 is changed based on the deviation between the vehicle body position and the planned travel route L1 in the above-described preferred embodiment, the automatic operation control unit 63 may, in the case where the direction of the planned travel route L1 and the travel direction of the tractor 1 (tractor body 3) (vehicle body heading direction) differ from each other, i.e., in the case where an angle of the vehicle body heading direction to the planned travel route L1 is equal to or greater than a threshold, set the angle of steering so that the angle is zero (the vehicle body heading direction F1 matches the direction of the planned travel route L1). The automatic operation control unit 63 may set the final angle of steering for the automatic operation based on an angle of steering determined based on the deviation (deviation in position) and an angle of steering determined based on directions (deviation in direction). Settings of the angle of steering in automatic operation in the above-described preferred embodiments are examples, and do not imply any limitation.

Note that, in the case where the planned travel route L1 is associated with vehicle speed, the automatic operation control unit 63 automatically changes the speed stage of the transmission, the speed of rotation of the prime mover, and/or the like so that the current speed of the tractor 1 matches the vehicle speed that corresponds to the planned travel route L1.

Furthermore, when the planned travel route L1 includes a straight route L1*a* and a turning route L1*b*, for example, the automatic operation control unit 63 causes automatic operation to be performed along the straight route L1*a* while the working device 2 is held in the lowered position so that the working device 2 is in the working position, and, at and after the point in time at which the working device 2 reaches the turning route L1*b*, causes automatic operation to be performed along the turning route L1*b* while the working device 2 is held in the raised position so that the working device 2 is in the non-working position.

Figure 6A:
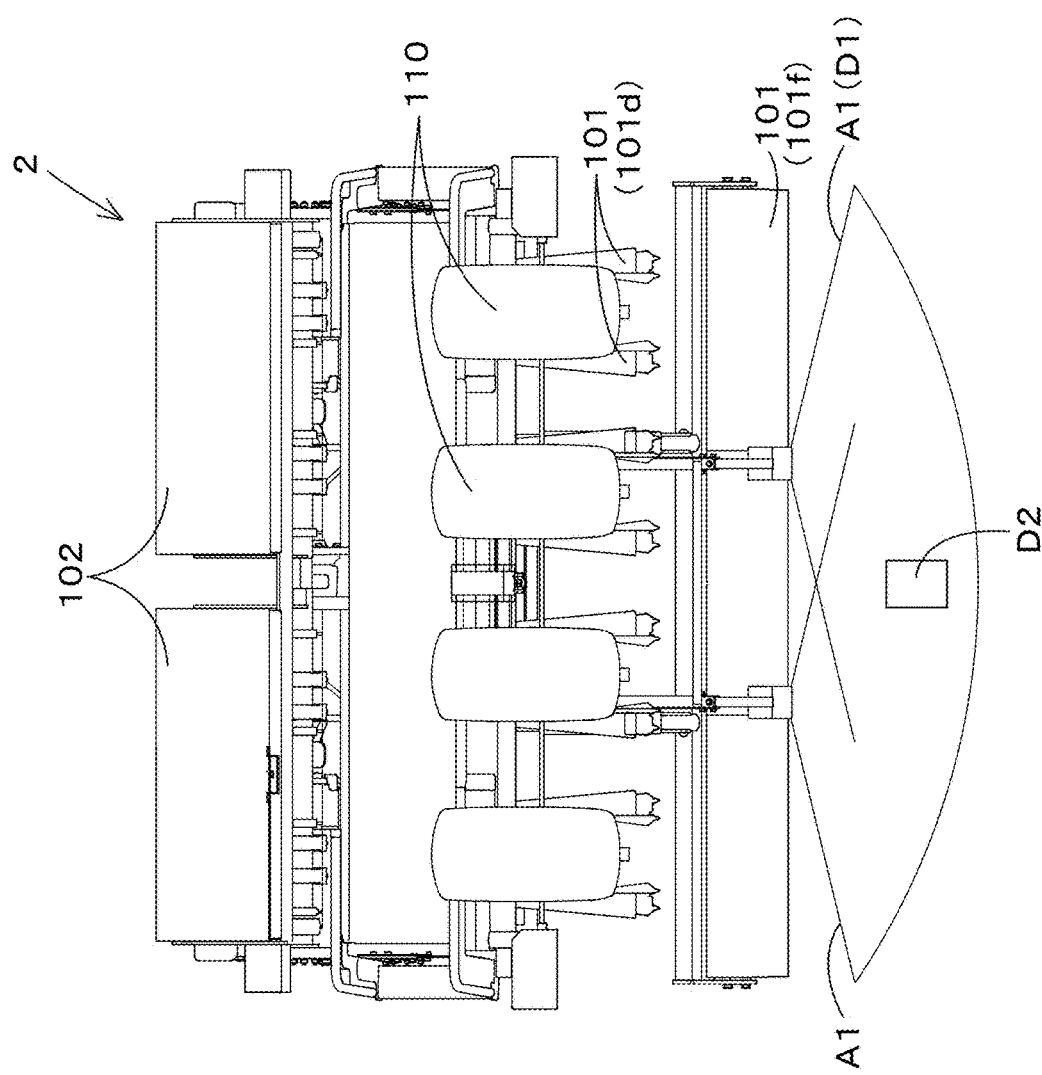
FIG. 6A illustrates first monitored information and an obstacle.

The controller 60 performs control relating to the automatic operation of the tractor 1 (traveling vehicle body 3) based on not only the planned travel route L1 but also monitored information (first monitored information) obtained by the first monitoring device 121. As illustrated in FIG. 6A, the automatic operation control unit 63 determines the automatic operation to be performed if first monitored information D1 contains no obstacles D2, and determines the automatic operation not to be performed if the first monitored information D1 contains an obstacle D2.

The first monitored information D1 includes, for example, data of the profile (shape) of an object or the like obtained when laser is scanned over the monitored area A1 in the case where the first monitoring device 121 is a laser scanner, includes data of the profile (shape) of an object or the like obtained when sound waves are scanned over the monitored area A1 in the case where the first monitoring device 121 is sonar, and includes data of an image (captured image) including the monitored area A1 in the case where the first monitoring device 121 is a camera.

The obstacle D2 is an animal such as a dog, a cat, or a raccoon dog, a human, or the like. Note that whether an object is an obstacle D2 or not is determined based on the size (height H1, width W1), actions, and/or the like of the object obtained using the first monitored information D1. For example, in the case where the object corresponds to the size of an animal such as a dog, a cat, a raccoon dog, or the like and moves as time passes, the object is determined to be an obstacle. How to determine whether the object is an obstacle D2 or not is not limited to the above example. Whether the object is an obstacle D2 or not may be determined based on the shape of the object or the temperature of the object, and there is no limitation.

The automatic operation control unit 63 refers to first monitored information D1 obtained by the first monitoring device(s) 121 when the tractor 1 (traveling vehicle body 3) is in a stopped state and in the automatic operation mode. If the first monitored information D1 contains an obstacle D2, the automatic operation control unit 63 does not cause automatic operation to be started, that is, the automatic operation control unit 63 keeps the tractor 1 (traveling vehicle body 3) in the stopped state. On the contrary, if the first monitored information D1 contains no obstacles D2, the automatic operation control unit 63 causes the automatic operation to be started and causes the tractor 1 (traveling vehicle body 3) to travel along the planned travel route L1.

After the initiation of the automatic operation, the automatic operation control unit 63 determines the automatic operation to be stopped if monitored information obtained when the working device 2 is held in a raised position by the raising/lowering device 8 contains an obstacle D2, and determines the automatic operation to continue if the monitored information contains no obstacles D2.

Figure 6B:
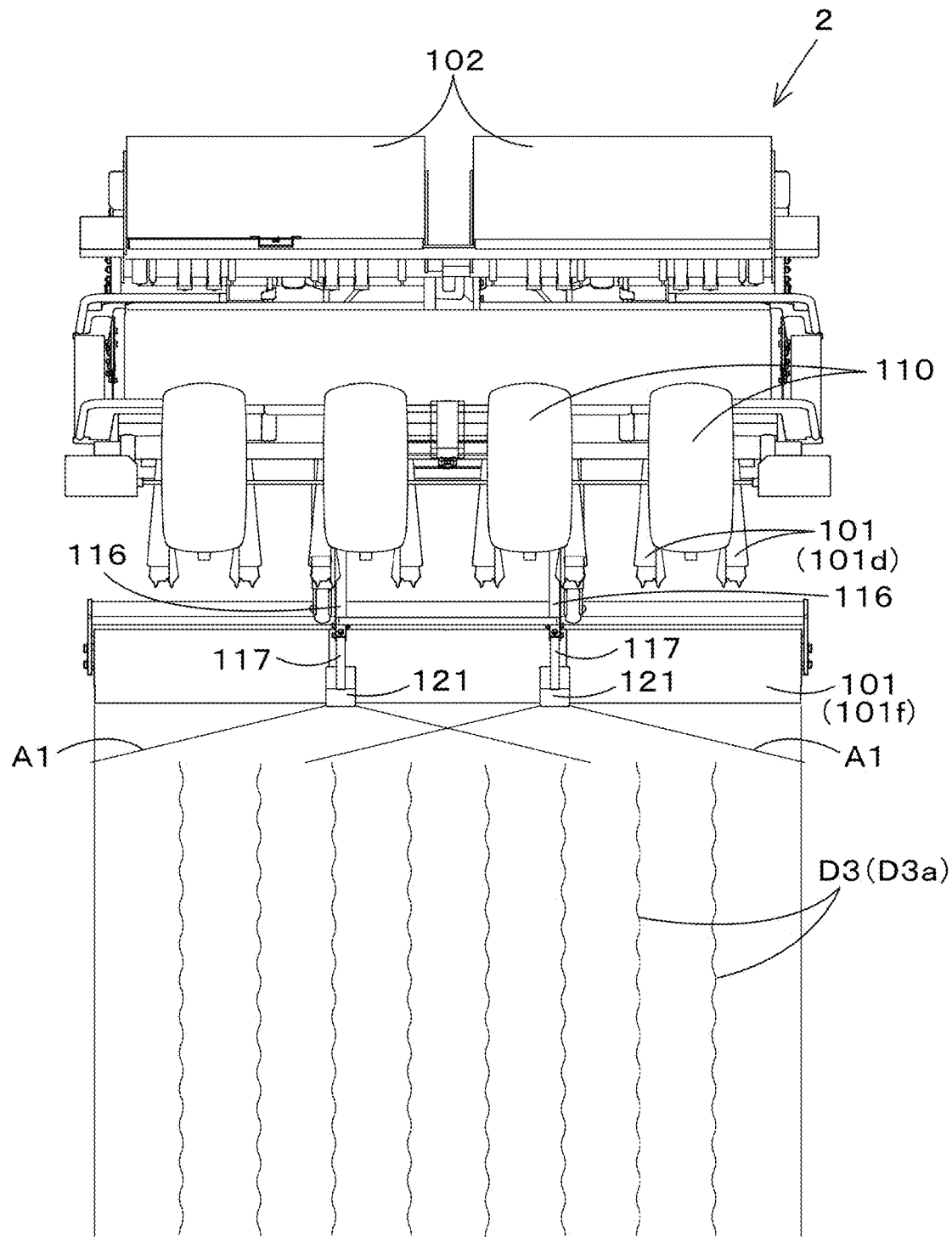
FIG. 6B shows an example of projections/depressions of an agricultural field (projections/depressions on the ground) after work is done by a working device.

The controller 60 not only controls automatic operation based on the first monitored information D1 obtained by the first monitoring devices 121 but also monitors worked condition(s) resulting from work done by the working device 2. The controller 60 includes a work management unit 64. The work management unit 64 includes electric/electronic circuit(s) provided in the controller 60, program(s) stored in a CPU and/or the like, and/or the like. The work management unit 64 extracts post-work conditions D3 (D3*a*, D3*b*) which are examples of the worked conditions, after the initiation of the automatic operation. As illustrated in FIG. 6B, in the case where the working device 2 is a seeder and/or a lister, elevations/depressions D3*a* in the agricultural field (elevations/depressions in the ground)

and/or the like after the seeding are extracted. Specifically, upon initiation of the automatic operation, the work management unit 64 refers to the first monitored information D1 and analyzes the profiles (shapes) in the first monitored information D1 to thereby extract the elevations/depressions D3*a* in the agricultural field after work. Note that FIG. 6B is an example, and does not imply any limitation. For example, in the case where the working device 2 is a planter, post-work conditions D3 which are the conditions of the planted seedlings and/or the like can be extracted. Alternatively, post-work conditions D3 behind various types of working device 2 can be detected. Upon extraction of post-work condition(s) D3, the work management unit 64 causes a display device 45 to display the extracted post-work condition(s) D3. The display device 45 is located, for example, in the vicinity of the operator's seat 10, and an operator can check the post-work condition(s) D3 displayed on the display device 45.

Figure 7:
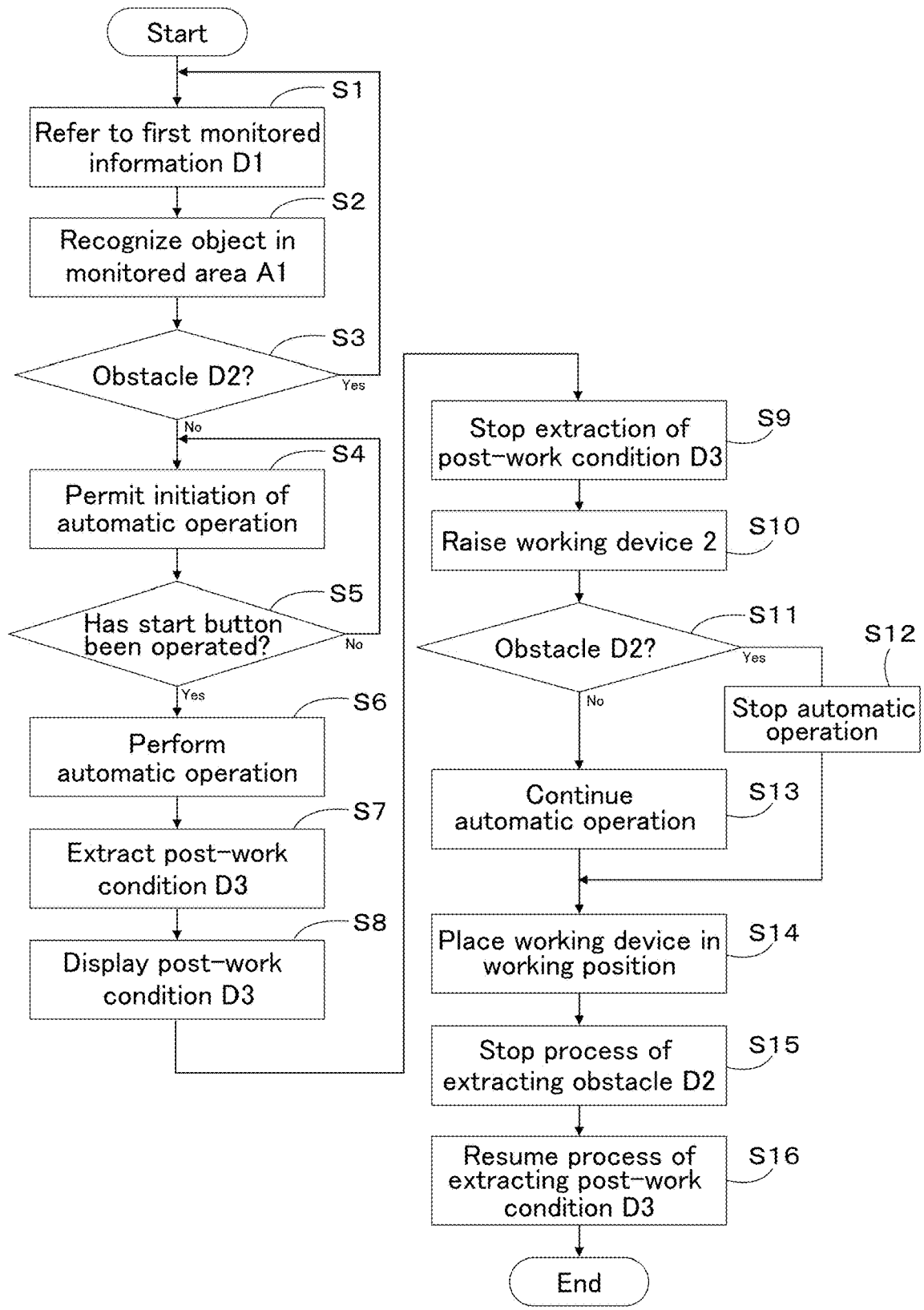
FIG. 7 shows how an automatic operation control unit and a work management unit operate.

FIG. 7 shows how the automatic operation control unit 63 and the work management unit 64 operate.

The automatic operation control unit 63 refers to the first monitored information D1 when the tractor 1 (traveling vehicle body 3) is in the stopped state and in the automatic operation mode (S1). The automatic operation control unit 63 analyzes the first monitored information D1 to recognize an object in the monitored area A1 (S2). The automatic operation control unit 63 determines whether or not the recognized object is an obstacle D2 (S3) and, if the object is an obstacle D2 (Yes in S3), the process returns to S1 and automatic operation is not started.

Figure 8A:
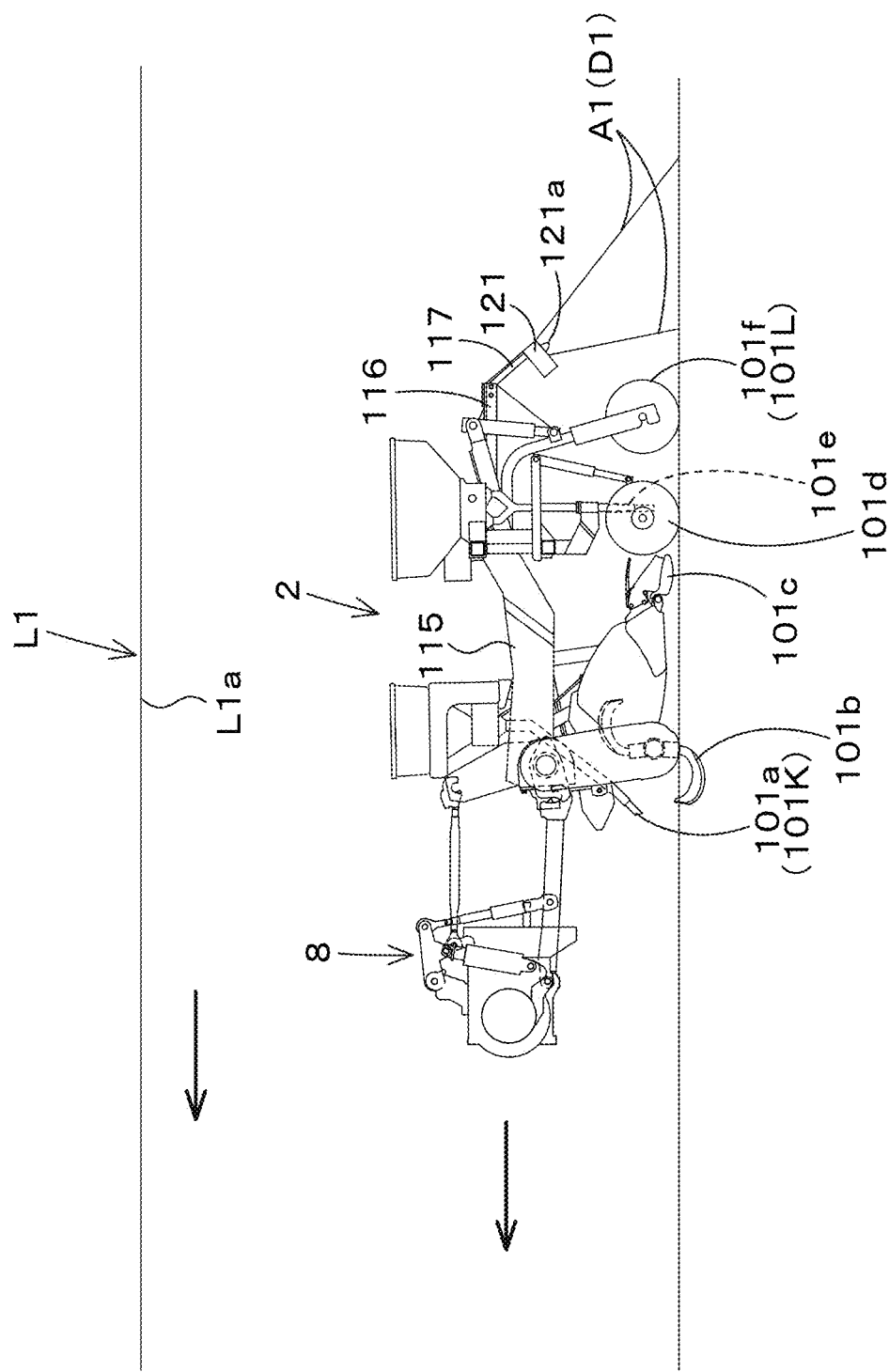
FIG. 8A illustrates a manner in which automatic operation is started with the working device held in a lowered position.

If the recognized object is not an obstacle D2 (No in S3), the automatic operation control unit 63 permits the initiation of automatic operation (S4), and, when a start button to start the automatic operation is pressed (Yes in S5), causes the automatic operation to performed (S6). The start button to start the automatic operation may be located in the vicinity of the operator's seat 10 and may be located on an external terminal such as a smartphone, a tablet, a remote controller, and/or the like. In the case of an external terminal, once the controller 60 has received, via a communication device on the tractor 1 from the external terminal, the fact indicating that the start button has been operated, the automatic operation control unit 63 causes automatic operation to be performed. For example, as illustrated in FIG. 8A, after the initiation of the automatic operation, the automatic operation control unit 63 causes the working device 2 to be lowered and causes the tractor 1 to travel (work against the ground) along a straight route L1*a* while performing the automatic operation. On the other hand, after the initiation of the automatic operation, when the work against the ground is being performed, the work management unit 64 analyzes the first monitored information D1 to recognize objects in the monitored area(s) A1, and extracts post-work condition(s) D3 such as elevations/depressions D3*a*, conditions D3*b* of planted seedlings, and/or the like in the agricultural field after the work (S7). The work management unit 64 causes the display device 45 to display the post-work condition(s) D3 (S8).

When the tractor 1 (traveling vehicle body 3) has reached a turning route L1*b* form the straight route L1*a*, the work management unit 64 stops the process of extracting the post-work condition(s) D3 (S9), and the automatic operation control unit 63 causes the raising/lowering device 8 to raise the working device 2 (S10). When the tractor 1 (traveling vehicle body 3) is traveling at least along the turning route L1*b* while performing the automatic operation with the working device 2 in the raised position, the automatic operation control unit 63 analyzes the first monitored information D1 to recognize an object in the monitored area A1 and determines whether or not the recognized object is an obstacle D2 (S11). If the recognized object is an obstacle D2 (Yes in S11), the automatic operation control unit 63 determines the automatic operation to be stopped, i.e., determines the tractor 1 (traveling vehicle body 3) to be stopped (S12).

If the recognized object is not an obstacle D2 (No in S11), the automatic operation control unit 63 determines the automatic operation to continue, and causes the automatic operation to continue such that the tractor 1 (traveling vehicle body 3) moves along the turning route L1*b* with the working device 2 in the raised position (S13).

Figure 8B:
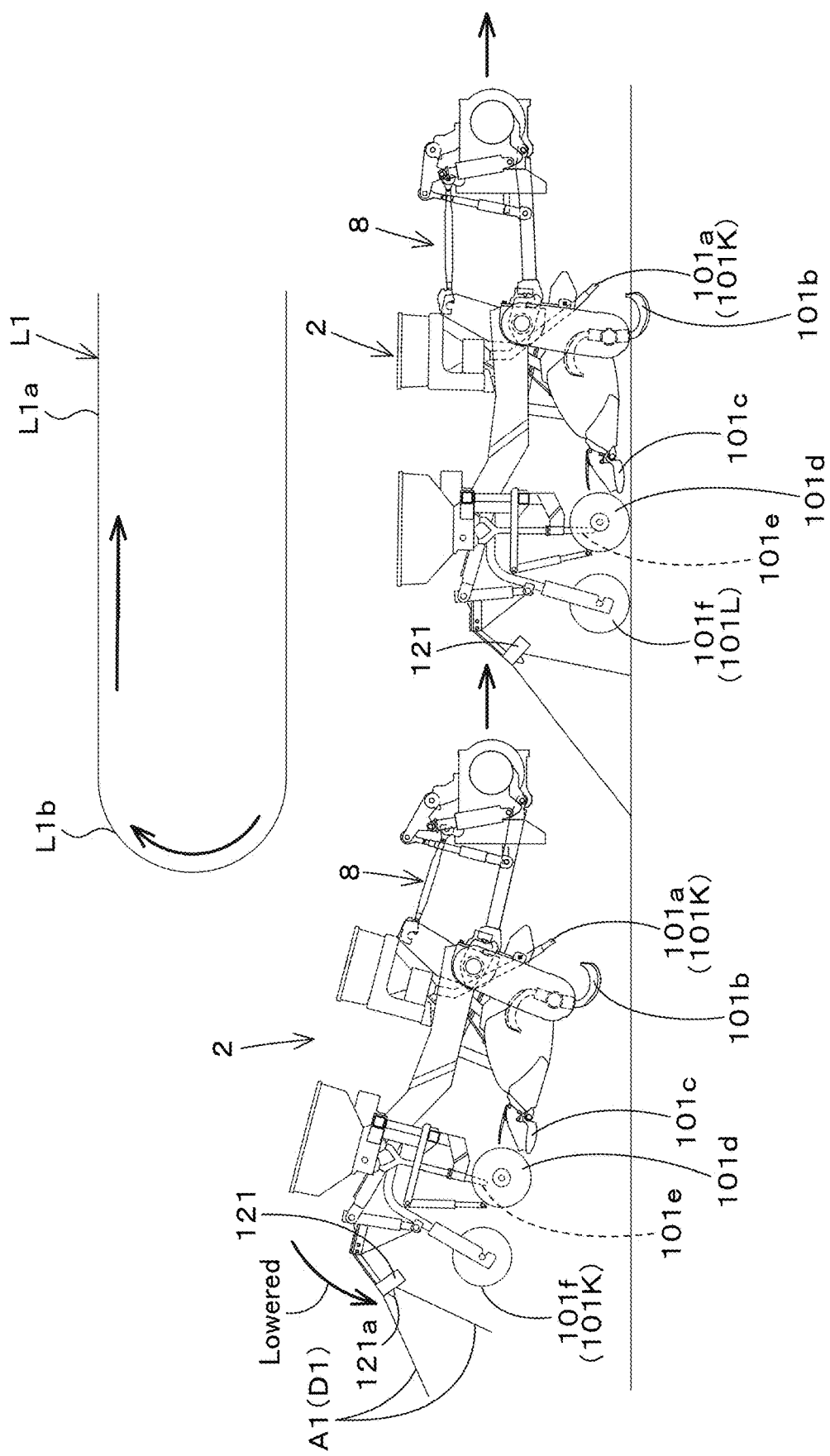
FIG. 8B illustrates a manner in which the working device is lowered from a raised position to the lowered position.

As illustrated in FIG. 8B, when the tractor 1 (traveling vehicle body 3) has reached a straight route L1*a* from the turning route L1*b*, the automatic operation control unit 63 causes the raising/lowering device 8 to lower the working device 2, thereby placing the working device 2 in a working position (S14). After the working device 2 is placed in the working position, the automatic operation control unit 63 stops the process of extracting obstacle(s) D2 (S15), and the work management unit 64 resumes the process of extracting post-work condition(s) D3 (S16).

As has been discussed, the automatic operation control unit 63 determines automatic operation to be performed if the first monitored information D1 contains no obstacles, and determines the automatic operation not to be performed if the first monitored information D1 contains an obstacle D2. Furthermore, after the initiation of the automatic operation, the automatic operation control unit 63 determines the automatic operation to be stopped if the first monitored information D1 obtained when the working device 2 is held in the raised position by the raising/lowering device 8 contains an obstacle D2, and determines the automatic operation to continue if the first monitored information D1 contains no obstacles D2. The work management unit 64 extracts worked condition(s) based on the first monitored information D1 obtained in a period from the initiation of the automatic operation to the raising of the working device 2, and does not extract the worked condition(s) while the working device 2 is in the raised position.

In the above-described preferred embodiment, with regard to the first monitored information D1 obtained by the first monitoring devices 121, the control of the automatic operation by the automatic operation control unit 63 and extraction (monitoring) of worked condition(s) resulting from the work done by the working device 2 are performed automatically. Note, however, that these may be performed manually. As illustrated in FIG. 1, the tractor 1 includes a switching device 66. The switching device 66 is a switch capable of toggling between two positions, is located in the vicinity of the operator's seat 10, and can be operated by an operator. When the switching device 66 is in one of the two positions, monitoring (automatic operation monitoring) by the automatic operation control unit 63 is performed using the first monitored information D1, and when the switching device 66 is in the other of the two positions, monitoring (worked condition monitoring) by the work management unit 64 is performed using the first monitored information D1.

Figure 9:
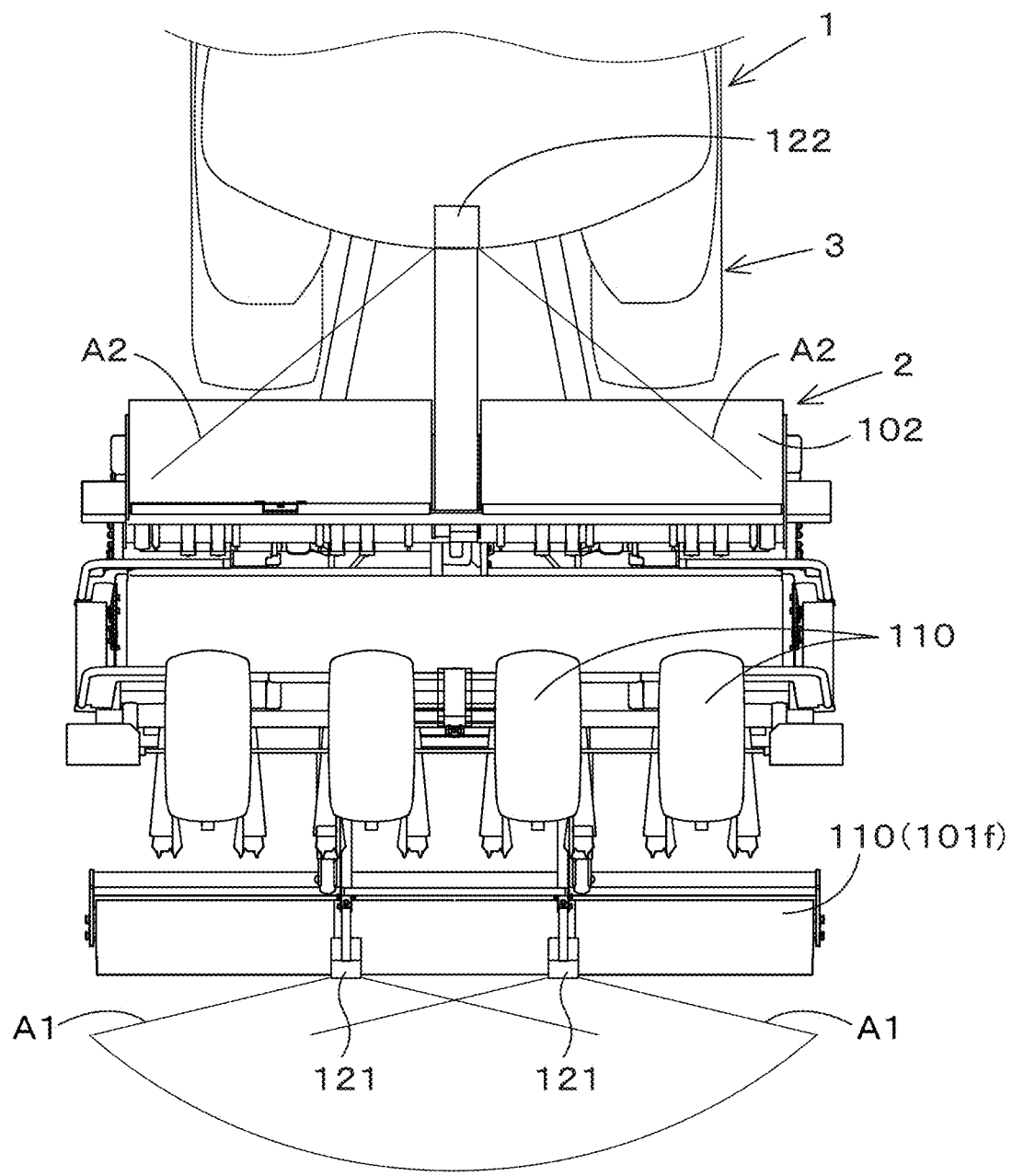
FIG. 9 illustrates a manner in which a second monitoring device is attached to the traveling vehicle body.

Note that the tractor 1 may include second monitoring device(s) 122 (second sensor(s)) as illustrated in FIG. 9. The second monitoring device 122 is provided on the traveling vehicle body 3, and its viewing direction is the same as those of the first monitoring devices 121. As illustrated in FIG. 9, the second monitoring device 122 is attached to a rear portion of the cabin 9, more specifically, to an upper rear portion of the cabin 9, via bracket(s). The configuration of the second monitoring device 122 is the same as those of the first monitoring devices 121, and therefore is not repeated. A monitored area A2 of the second monitoring device 122 is located rearward of the traveling vehicle body 3, and includes an area between the traveling vehicle body 3 and the working device 2. Monitored information obtained by the second monitoring device 122 can be used in automatic operation monitoring and worked condition monitoring, similar to the monitored information obtained by the first monitoring devices 121.

A working vehicle (tractor 1) includes a traveling vehicle body 3, a linking device 8 capable of linking a working device 2 to the traveling vehicle body 3, a first monitoring device 121 to monitor at least a surrounding area of the working device 2, the first monitoring device 121 being provided on the working device 2, and a controller 60 to perform control relating to automatic operation of the traveling vehicle body 3 based on a planned travel route L1 and monitored information (first monitored information) D1 obtained by the first monitoring device 121. With this, even in cases where the working device 2 is linked to the traveling vehicle body 3, it is possible to monitor the surrounding area of the working device 2 using the first monitoring device 121, and possible to perform automatic operation smoothly even in cases where the working device 2 is linked to the traveling vehicle body 3.

The controller 60 is configured or programmed to include an automatic operation control unit 63 to determine the automatic operation to be performed if the monitored information (first monitored information) D1 contains no obstacles and to determine the automatic operation not to be performed if the monitored information (first monitored information) D1 contains an obstacle. This achieves the following: the surrounding area of the working device 2 is monitored using the monitored information (first monitored information) D1; and automatic operation is started if there are no obstacles and the automatic operation is not performed if there is an obstacle. This makes it possible to achieve more advanced automatic operation while the working device 2 is attached to the traveling vehicle body 3.

The linking device 8 is a raising/lowering device to raise and lower the working device 2, and after initiation of the automatic operation, the automatic operation control unit 63 determines the automatic operation to be stopped if the monitored information (first monitored information) D1 obtained when the working device 2 is held in a raised position by the raising/lowering device contains an obstacle D2. With this, in the case where the working device 2 is raised, it is possible to check the conditions of the surrounding area while the working device 2 in the raised position, and possible to stop the automatic operation if there is an obstacle D2.

The controller 60 is configured or programmed to include a work management unit 64 to extract one or more worked conditions resulting from work done by the working device 2 based on the monitored information (first monitored information) D1 obtained by the first monitoring device 121. This makes it possible to know the worked conditions during work.

A working vehicle (tractor 1) includes a traveling vehicle body 3, a linking device 8 capable of linking a working device 2 to the traveling vehicle body 3, a first monitoring device 121 provided on the working device 2, and a controller 60 including an automatic operation control unit 63 to perform control relating to automatic operation of the traveling vehicle body 3 based on a planned travel route L1 and monitored information (first monitored information) D1 obtained by the first monitoring device 121, and a work management unit 64 to extract one or more worked conditions resulting from work done by the working device 2 based on the monitored information (first monitored information) D1. This makes it possible to perform both the control of automatic operation and the monitoring of worked conditions using the first monitored information D1 obtained by the first monitoring device 121.

The work management unit 64 extracts the one or more worked conditions after initiation of the automatic operation. This makes it possible to know, for example, worked conditions while work is done by automatic operation.

The linking device 8 is a raising/lowering device to raise and lower the working device 2, the automatic operation control unit 63 determines the automatic operation to be performed if the monitored information (first monitored information) D1 contains no obstacles, and determines the automatic operation not to be performed if the monitored information (first monitored information) D1 contains an obstacle, and after initiation of the automatic operation, determines the automatic operation to be stopped if the monitored information (first monitored information) D1 obtained when the working device 2 is held in a raised position by the raising/lowering device contains an obstacle, and determines the automatic operation to continue if the monitored information (first monitored information) D1 obtained when the working device 2 is held in the raised position by the raising/lowering device contains no obstacles, and the work management unit 64 extracts the one or more worked conditions based on the first monitored information (first monitored information) D1 obtained in a period from the initiation of the automatic operation to raising of the working device 2. This not only achieves the following: automatic operation is started by the automatic operation control unit 63 if there are no obstacles in the first monitored information D1 before the automatic operation; and the automatic operation is not performed by the automatic operation control unit 63 if there is an obstacle, but also achieves the following: after the initiation of the automatic operation, it is possible to check worked conditions in a period from the initiation of the automatic operation to raising of the working device 2, i.e., while work against the ground or the like is done by the working device 2.

The working vehicle (tractor 1) further includes a switching device to, with regard to the monitored information (first monitored information) D1 obtained by the first monitoring device 121, switch between control of the automatic operation by the automatic operation control unit 63 and monitoring of the one or more worked conditions resulting from work done by the working device 2. With this, an operator (driver) can easily switch between the monitoring in automatic operation and the monitoring of worked conditions, making it possible to perform appropriate monitoring according to work and/or the like.

The working vehicle (tractor 1) further includes a second monitoring device 122 provided on the traveling vehicle body 3, a viewing direction of the second monitoring device 122 being the same as a viewing direction of the first monitoring device 121. With this, it is possible to perform monitoring relating to automatic operation or monitoring relating to work also using the second monitoring device 122, making it possible to assist the first monitoring device 121. For example, it is possible to monitor a space between the traveling vehicle body 3 and a front portion of the working device 2 using the second monitoring device 122.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
a traveling vehicle body;
a linking device provided on the traveling vehicle body and capable of linking a working device;
a first sensor provided on the working device to monitor at least a surrounding area of the working device; and
a controller to perform control relating to automatic operation of the traveling vehicle body based on a planned travel route and based on monitored information obtained by the first sensor with the working device linked to the linking device; wherein
the controller is configured or programmed to define and function as an automatic operation controller to:
analyze the monitored information to recognize an object in a monitored area of the first sensor and determine whether or not the object is an obstacle;
start the automatic operation if the object is not an obstacle; and
not start the automatic operation if the object is an obstacle;
the controller is configured or programmed to define and function as a work manager to extract one or more worked conditions resulting from work done by the working device based on the monitored information obtained by the first sensor;
the automatic operation controller is configured or programmed to, after initiation of the automatic operation:
cause the working device to perform the work when causing the traveling vehicle body to travel along a straight route included in the planned travel route;
not cause the working device to perform the work and to determine whether or not the object in the monitored area is an obstacle based on the monitored information when causing the traveling vehicle body to travel along a turning route included in the planned travel route; and
the work manager is configured or programmed to:
when the traveling vehicle body is traveling along the straight route, extract the one or more worked conditions based on the monitored information; and
when the traveling vehicle body is traveling along the turning route, stop extracting the one or more worked conditions based on the monitored information.

2. The working vehicle according to claim 1, wherein
the linking device includes a raising/lowering device to raise and lower the working device; and
the automatic operation controller is configured or programmed to, after initiation of the automatic operation, analyze the monitored information obtained when the working device is held in a raised position by the raising/lowering device to recognize the object in the monitored area and determine whether or not the object is an obstacle, and stop the automatic operation if the object is an obstacle.

3. A working vehicle comprising:
a traveling vehicle body;
a linking device provided on the traveling vehicle body and capable of linking a working device;
a first sensor provided on the working device;
a switch; and
a controller configured or programmed to define and function as:
an automatic operation controller to perform control relating to automatic operation of the traveling vehicle body based on a planned travel route and based on monitored information obtained by the first sensor with the working device linked to the traveling vehicle body; and
a work manager to extract one or more worked conditions resulting from work done by the working device and cause a display to display the one or more worked conditions based on the monitored information; wherein
the switch is to be operated to switch between causing the automatic operation controller to perform the control relating to the automatic operation based on the monitored information and causing the work manager to extract the one or more worked conditions resulting from work done by the working device based on the monitored information.

4. The working vehicle according to claim 3, wherein the work manager is configured or programmed to extract the one or more worked conditions after initiation of the automatic operation.

5. The working vehicle according to claim 3, wherein
the linking device includes a raising/lowering device to raise and lower the working device;
the automatic operation controller is configured or programmed to:
analyze the monitored information with the traveling vehicle body in a stopped state to recognize an object in a monitored area of the first sensor and determine whether or not the object is an obstacle, start the automatic operation if the object is not an obstacle, and not start the automatic operation if the object is an obstacle; and
after initiation of the automatic operation, analyze the monitored information obtained when the working device is held in a raised position by the raising/lowering device to recognize the object in the monitored area and determine whether or not the object is an obstacle, stop the automatic operation if the object is an obstacle, and continue the automatic operation if the object is not an obstacle; and
the work manager is configured or programmed to extract the one or more worked conditions based on the monitored information obtained in a period from the initiation of the automatic operation to raising of the working device, and extract the one or more worked conditions based on the monitored information obtained during work done by the working device after the initiation of the automatic operation.

6. The working vehicle according to claim 1, further comprising a second sensor provided on the traveling vehicle body, a viewing direction of the second sensor being the same as a viewing direction of the first sensor.

7. A working vehicle comprising:
a traveling vehicle body;
a linking device provided on the traveling vehicle body and capable of linking a working device;
a first sensor provided on the working device; and
a controller configured or programmed to define and function as:
an automatic operation controller to perform control relating to automatic operation of the traveling vehicle body based on a planned travel route and based on monitored information obtained by the first sensor with the working device linked to the traveling vehicle body; and a work manager to extract one or more worked conditions resulting from work done by the working device and cause a display to display the one or more worked conditions based on the monitored information; wherein the automatic operation controller is configured or programmed to:
when no work is being performed by the working device before or after initiation of the automatic operation, perform control relating to the automatic operation based on the planned travel route and the monitored information; and
when work is being performed by the working device and the traveling vehicle body is traveling after the initiation of the automatic operation, perform control relating to the automatic operation based on the planned travel route; and the work manager is configured or programmed to extract the one or more worked conditions based on the monitored information when work is being performed by the working device and the traveling vehicle body is traveling after the initiation of the automatic operation.

8. The working vehicle according to claim 7, wherein the automatic operation controller is configured or programmed to analyze the monitored information to recognize an object in a monitored area of the first sensor and determine whether or not the object is an obstacle, perform the automatic operation if the object is not an obstacle, and not perform the automatic operation if the object is an obstacle.

9. The working vehicle according to claim 8, wherein
the linking device includes a raising/lowering device to raise and lower the working device;
the automatic operation controller is configured or programmed to, after the initiation of the automatic operation, determine whether or not the object in the monitored area is an obstacle based on the monitored information when the working device is raised and held in a non-working position by the raising/lowering device; and
the work manager is configured or programmed to, after the initiation of the automatic operation, extract the one or more worked conditions based on the monitored information when the working device is lowered and held in a working position by the raising/lowering device.

10. The working vehicle according to claim 5, wherein
the automatic operation controller is configured or programmed to, after the initiation of the automatic operation:
cause the working device to perform the work when causing the traveling vehicle body to travel along a straight route included in the planned travel route;
not cause the working device to perform the work and to determine whether or not the object in the monitored area is an obstacle based on the monitored information when causing the traveling vehicle body to travel along a turning route included in the planned travel route; and the work manager is configured or programmed to:
when the traveling vehicle body is traveling along the straight route, extract the one or more worked conditions based on the monitored information; and
when the traveling vehicle body is traveling along the turning route, stop extracting the one or more worked conditions based on the monitored information.

11. The working vehicle according to claim 8, wherein
the automatic operation controller is configured or programmed to, after the initiation of the automatic operation:
cause the working device to perform the work when causing the traveling vehicle body to travel along a straight route included in the planned travel route;
not cause the working device to perform the work and to determine whether or not the object in the monitored area is an obstacle based on the monitored information when causing the traveling vehicle body to travel along a turning route included in the planned travel route; and the work manager is configured or programmed to:
when the traveling vehicle body is traveling along the straight route, extract the one or more worked conditions based on the monitored information; and
when the traveling vehicle body is traveling along the turning route, stop extracting the one or more worked conditions based on the monitored information.

12. The working vehicle according to claim 1, wherein the controller is configured or programmed to analyze the monitored information to determine a size and/or an action of the object and determine whether or not the object is an obstacle which is an animal based on the size and/or the action of the object.

13. The working vehicle according to claim 5, wherein the controller is configured or programmed to analyze the monitored information to determine a size and/or an action of the object and determine whether or not the object is an obstacle which is an animal based on the size and/or the action of the object.

14. The working vehicle according to claim 8, wherein the controller is configured or programmed to analyze the monitored information to determine a size and/or an action of the object and determine whether or not the object is an obstacle which is an animal based on the size and/or the action of the object.

* * * * *